United States Patent [19]

Olsson

[11] Patent Number: 4,906,174
[45] Date of Patent: Mar. 6, 1990

[54] NON-RETURN VALVE FOR PULSATING BURNERS

[75] Inventor: Karl B. Olsson, Kivik, Sweden

[73] Assignee: Mareck B.V., Amsterdam, Netherlands

[21] Appl. No.: 361,833

[22] Filed: May 30, 1989

Related U.S. Application Data

[63] Continuation of Ser. No. 645,327, filed as PCT SE83/00488 on Dec. 30, 1983, published as WO84/02762 on Jul. 19, 1984, abandoned.

[30] Foreign Application Priority Data

Dec. 30, 1982 [SE] Sweden ............................ 8207522

[51] Int. Cl.$^4$ ............................................. F23C 11/04
[52] U.S. Cl. ..................................... 431/1; 137/852; 137/859; 137/860; 60/39.8
[58] Field of Search ................... 431/1; 137/852, 855, 137/854, 859, 860, 845; 251/61.1; 60/247, 249, 39.8, 39.78

[56] References Cited

U.S. PATENT DOCUMENTS

| | | | |
|---|---|---|---|
| 2,950,592 | 8/1960 | Frank | 431/1 X |
| 3,036,592 | 5/1962 | Lips | 137/854 X |
| 3,830,253 | 8/1974 | Speich et al. | 137/525 |
| 4,248,585 | 2/1981 | Marcyniuk | 431/1 X |

FOREIGN PATENT DOCUMENTS 617642  2/1927  France ................... 431/1

Primary Examiner—Randall L. Green
Attorney, Agent, or Firm—Cushman, Darby & Cushman

[57] ABSTRACT

The non-return valve in the air inlet of a pulsating burner includes a flat circular ring of elastic steel. The outer edge of the ring is provided between annular abutment surfaces with a predetermined play. The inner edge of the ring is movable from a closed position to a fully open position in which it has the shape of a truncated cone. The angle between the conical surface of the frustrum and its base is small in the fully open position, on the order of 3°, and resistance to opening is extremely small to permit rapid changes between the open and closed positions.

3 Claims, 4 Drawing Sheets

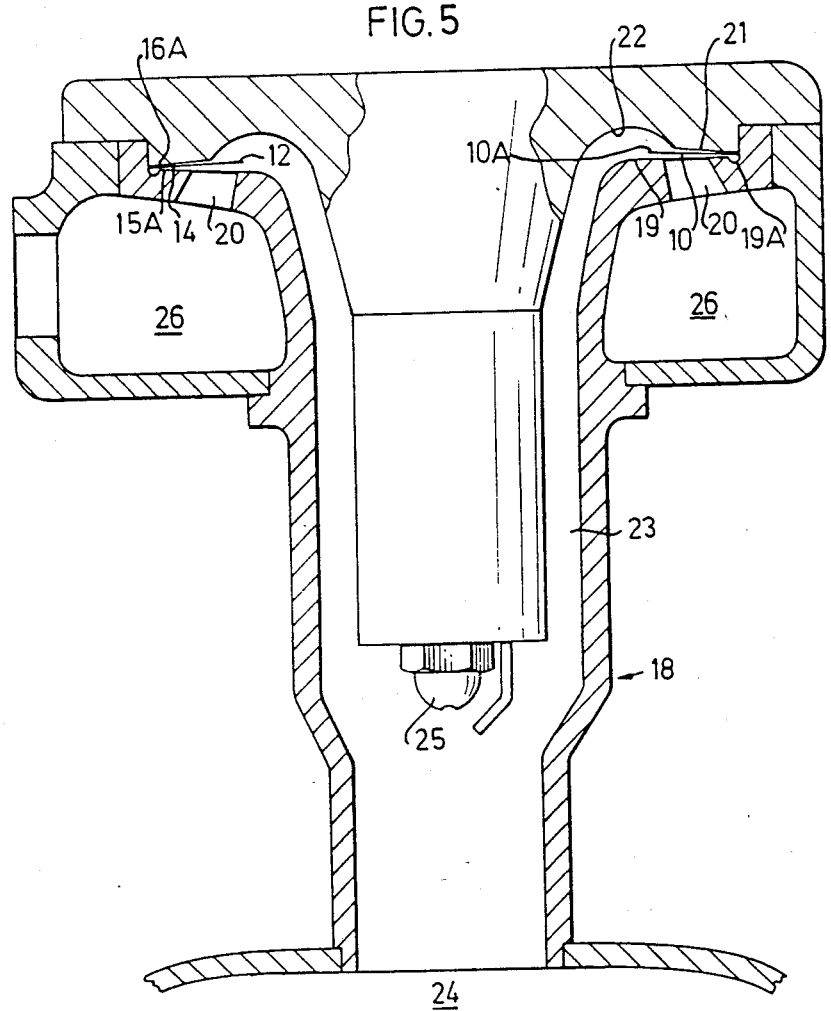

NON-RETURN VALVE FOR PULSATING BURNERS

BACKGROUND OF THE INVENTION

This is a continuation of application Ser. No. 645,327, filed as PCT SE83/00488 on Dec. 30, 1983, published as WO84/02762 on Jul. 19, 1984, now abandoned.

The present invention relates to a non-return valve in the air inlet of a pulsating burner, which may be of the type described in U.S. Pat. No. 3,267,986 (K. B. OLSSON) and U.S. Pat. No. 3,267,985 (J. A. KITCHEN).

In such a burner the combustion air is inducted to the combustion chamber via a non-return valve, fuel being mixed into the air after the non-return valve. The fuel may be liquid, gaseous or pulverulent.

The non-return valve opens and closes under the action of the sub- and excess pressure phases obtained in conjunction with the pulsating combustion. Since these phases alternate with a frequency of 60 pulses per second or more, for example, it is a question of very rapid cycles and accordingly extremely short intervals, during which the non-return valve shall reach its open position, remain in its open position and then close.

In accordance with the U.S. Pat. No. 3,267,986, the non-return valve comprises a plurality of resilient steel leaves, fastened at one end to form flexible tongues. A disadvantage with these is that they afford a rapidly increasing resistance to opening from the closed position, resulting in that they must be set slightly open in the initial position. When they are kept in the closed position during operation, there is thus an initial force co-acting to initiate opening of the valve tongue when it is subjected to the sub-pressure phase. Since there are a plurality of such valve tongues, this results in certain difficulties in achieving the same setting of all the tongues. Furthermore, the valve tongues are not exactly the same with regard to their spring properties, resulting in that they can have different attitudes in the fully open position. The fully open position can furthermore change to a greater or less extent with time, due to fatigue occurring in the tongues. The resilient valve tongues thus involve certain difficulties in achieving desired precision in the opening and closing movements of the valve, and maintaining this precision for long operational periods. A further disadvantage is that the valve tongues cannot be opened as rapidly as desired at the beginning of the sub-pressure phase, since the opening movement is braked by the spring bias of the tongue after the tongue has passed said initial position where it is somewhat open.

U.S. Pat. No. 3 267 985 describes the use of lamellae which are situated loosely on a seating and may be lifted from it to a given end position determining the completely closed position of the valve. A condition with this type of valve is that the apparatus is mounted vertically so that the lamellae are acted on vertically by gravity. The lamellae are disposed loosely on an abutment plate with orifices, such that excess pressure gas can be led through these holes to a lamella when it is to be lifted into engagement with the seating above it for closing its inlet opening. A plurality of such non-return valves of comparatively small size must be used to obtain the necessary rapidity in the opening and closing movements. Each lamella must be controlled by axial guide means at the edge of the lamella, resulting in varying friction against its guide means and a certain risk that the non-return valves will operate with relatively different degrees of frictional resistance. In turn, this involves the risk that some valves will open or close more rapidly than others, and in its turn this can lead to operational disturbances of a more or less serious nature. Further to this there is the situation that during the sub-pressure phase, induction air should be distributed as evenly as possible in order that the lamellae of all the valves will be actuated as uniformly as possible. This also applies during the excess pressure phase, when the excess pressure shall lift the lamellae to the closing position. If the valves are subjected to different sub-pressures or excess pressures, this may also result in operational disturbances. In addition to this, there is the fact that the loose lamellae are to a certain extent dependent on the apparatus retaining a constant vertical attitude, since the function of these valves is based on vertical reciprocating displacement of the lamellae. Thus, if the apparatus is fitted in a ship, for example, there is the risk that the lamellae are effected by lateral forces striving to deflect them from their normal path of motion, which may in turn result in operational disturbances as well.

As far as impulse burners are concerned, it is generally applicable that the non-return valve, or valves, must operate with the least possible resistance in order to open and close rapidly, a further desire being that these movements shall be as distinct as possible and that they shall accurately adapt themselves to the pulsating combustion cycle, thereby to achieve effective combustion. More rapid opening and closing also enables higher heating power. A still further desire is that the non-return valve will be simple and cheap to manufacture, and easy to fit or exchange if so required.

The object of the present invention is to provide a non-return valve for a pulse burner which eliminates the disadvantages with the known non-return valves as far as possible.

With this object in mind, the invention is based on a non-return valve operating with a ring, known per se, which is thin and flat, and of elastic material such as steel or plastics. Such a ring is illustrated in the U.S. Pat. No. 3,830,253, for example. However, according to this patent, the flat ring is deflected about a geometric axis at right-angles to the central axis of the ring, so that in an open position the ring abuts against an abutment surface constituting a part of a cylindrical surface. As soon as the known ring is lifted from its closed position, the spring bias will accordingly begin to grow immediately, which acts to retard the opening movement in the same way as with a spring non-return valve tongue.

Briefly, the invention involves the use of a thin flat ring, known per se, of elastically flexible material, which, according to the invention, is fitted in a new and special way in order to utilize intrinsic properties of the ring. These properties will be apparent from the following consideration of a ring of thin elastic material such as steel or plastics, for example, steel with a thickness in the range of 0.15 to 0.30 mm. The ring has an outside diameter of about 12 cm and an inner diameter of about 7 cm, the width of the ring thus being about 2.5 cm. If the ring is now held along one edge circumference, either the outer or the inner, and a very small force is applied axially along the other edge circumference, the ring will deflect to an intermediate position, which cannot be exceeded without the force being increased very heavily and the ring being permanently deformed. The edge circumference of the ring thus has two distinct separate ranges of movement, namely a first range where the axial force is extremely small, in the order of magnitude of some water column mm acting on the surface of the ring, and a second range where the force is many times greater, and results in undesired permanent deformation of the ring.

In the first movement range, the ring will form a truncated cone having varying size. When this cone approaches the intermediate position mentioned above, the sloping surface of the cone forms a very small angle to the base thereof, in the order of magnitude 3°. To deflect the ring to the intermediate position from the initial or flat position thereof thus requires practically no force, i.e. it is extremely easy to come to the intermediate position, which means that the material in the ring affords very little resistance.

With these properties of the ring in question in mind, the invention is based on the concept that these properties can be utilized in an extremely advantageous way in a non return valve for a pulsating burner, with its rapid alternations between sub- and excess pressure phases.

The ring is placed in a flat condition above an inlet, preferably in a form of a plurality of induction openings, or an induction slit, with one side of the ring facing towards a duct to the combustion chamber, and its other side facing towards the inlet communicating with ambient air, suitably via a sub-pressure chamber.

In an embodiment of the invention, the edge or outer edge portion of the ring is practically completely prevented from moving axially by it being disposed with a very small play in a slot, or the like. On the other hand, the inner edge of the ring is free to move axially. In practice, the fact that the play is not too small can be established by it still being possible to turn the ring.

In operation, one side of the ring will be subjected to excess and sub-pressure phases caused by the combustion in the combustion chamber, while its other side is acted on by a varying sub-pressure. The direction of force alternates in correspondance to the frequency of the pulsating burner.

Practical tests with such a non-return valve in accordance with the invention have shown that it opens and closes so rapidly that it is entirely open during the greater part of the sub-pressure phase, which is desirable. This results in that the pulsating burner will be more independent of varying operational conditions, while improved combustion result is obtained at the same time.

BRIEF DESCRIPTION OF THE DRAWINGS

These and other details and advantages distinguishing the non-return valve in accordance with the invention will now be described in detail, with reference to the accompanying drawings in which a non-return valve in accordance with the invention is schematically illustrated, and in which:

FIG. 5 is a schematic section through the inlet of a pulsating burner having a non-return valve in accordance with the invention.

DETAILED DESCRIPTION

Figure 1:
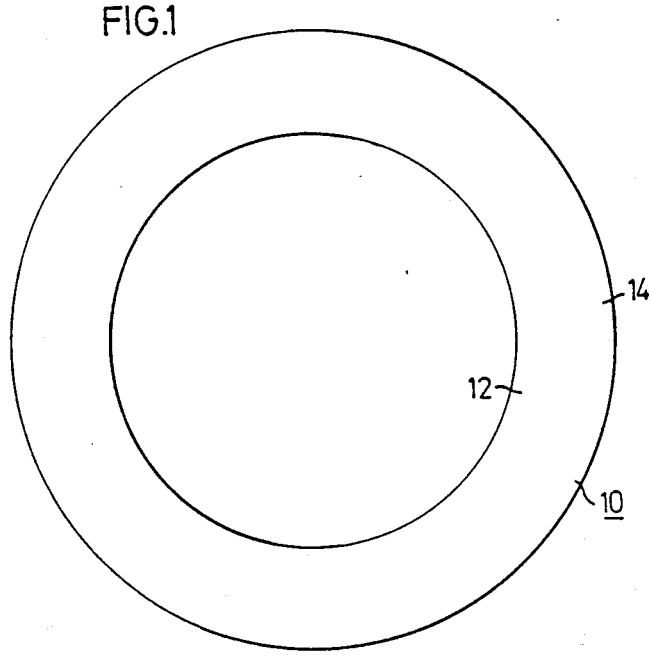
FIG. 1 is a plan view of a flat and thin steel ring.
Figure 2:
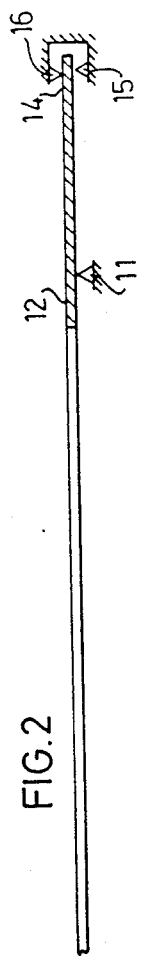
FIG. 2 illustrates the ring in a flat attitude supported on an annular support and held along its outer edge such that it may be rotated.
Figure 3:
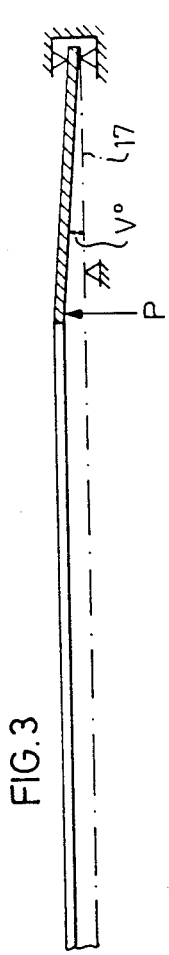
FIG. 3 illustrates the ring upwardly deflected into the shape of a truncated cone, the height of which is very small in comparison with the diameter of its base.

The flat steel ring 10 illustrated in FIGS. 1–3 suitably has a thickness in the range of 0.15 to 0.30 mm. The ring is supported on an annular support 11, and has its inner circumference edge, free to move axially upwards in FIG. 2. The outer circumference edge 14 of the ring is practically completely axially fixed between a lower support 15 and an upper support 16, with a very small clearance, which however permits the ring to be rotated.

If the ring is now loaded with an axial, circumferential force, schematically illustrated by the arrow denoted by P, the ring will be deflected upwards into the shape of a truncated cone, the conical surface of which forms the angle V° with the base 17 thereof. Simultaneously with this upward deflection there is obtained a small radial movement inwards of the outer circumference edge of the ring, which is allowed by the minimum play between the supports 15 and 16. Initially, the force P is practically 0 and remains almost just as small until the angle V reaches a value of about 3°. Passing this position can only occur if the force P is increased many times and to values which lead to permanent deformation of the ring.

Figure 4:
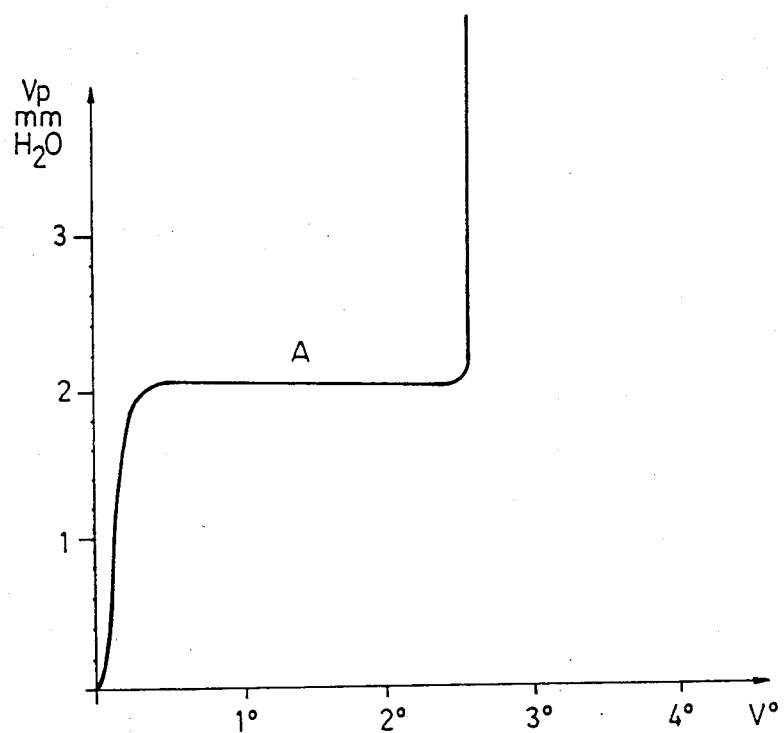
FIG. 4 is a diagram illustrating the force required to lift the inner edge of the ring as in FIG. 3, as a function of the angle between the conical surface of the frustrum and its base.

If the force P is taken to correspond to mm of water head Vp, the graph according to FIG. 4 may be plotted. From the graph it will be seen that the force P in mm Vp increases from 0 to a value A not very far away from 0, namely only 2 mm Vp, and remains constant in this particular case up to 2.6° for the angle V between the conical surface of the frustrum and its base. This force is thus so small that in practice it means that the ring does not offer any resistance in the range of movement +/−2.6°. However, if it is attempted to exceed these limits, there will be immediate, total retardation, since the required force increases practically vertically upwards in the diagram.

This property of the ring with the described method of restraint at the outer circumference edge thereof in combination with the ring being thin, and thus having a very small mass, provides the properties of the ring desired in a non-return valve for the rapid pressure alternations occurring in a pulsating burner.

FIG. 5 illustrates how a ring in accordance with the invention is fitted as a non-return valve in a schematically illustrated pulsating burner 18.

A plurality of inlet openings 20 are made in an annular seating 19. The seating may be flat (horizontal in the figure) or somewhat sloping inwardly downwards. The thin steel ring 10, implemented as illustrated in FIGS. 1–3, is placed on the seating. The ring is practically completely fixed in an axial direction along its outer circumference edge, between the outer edge portion of the seating 15A and the opposite edge portion 16A of a wall 21. The wall forms together with the seat an annular gap in which the ring is movable between its end positions.

A small groove 19A is made at the outer edge of the seating 19, in order to give the outer circumference edge of the ring freedom of movement upwards and downwards when the ring is deflected upwards and downwards for opening and closing.

In the vicinity of the inner edge portion of the ring the wall 21 is hollowed out at 22 to uncover this edge portion on its upper side 10A. The wall and seating merge thereafter in the walls to an axial duct 23 leading to the combustion chamber 24. Fuel is injected through a nozzle 25 and mixes with air before entering the combustion chamber.

The air is inducted via a sub-pressure chamber 26.

Figure 6:
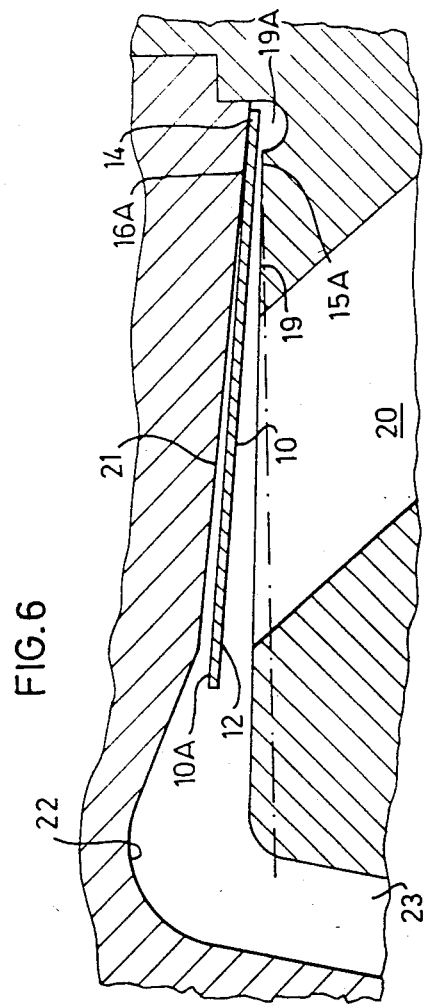

As will be seen from the enlarged partial depiction of the non-return valve in FIG. 6, the ring in this figure has been deflected upwards to the fully open position. Since the ring itself determines its maximum opening position, there is no need of any abutment limiting the opening movement of the ring. Instead, there is a gap between the wall 21 and the ring in its open position, such that excess pressure may act in this gap for closing the valve.

The intention with the uncovered inner edge portion 10A of the ring is that when the excess pressure pulse reaches the inner circumference edge of the ring for closing the valve, this pressure wave will be guided upwards from the axial duct 23, into the hollowed-out portion 22 of the wall, and then downwards towards the upper side of the free edge portion 10A, thereby coacting in a rapid and reliable closure. Initiation of the closing movement will therefore be very effective and distinct.

The invention is naturally not limited to the embodiment described hereinbefore. In certain cases it nay be suitable to combine a plurality of non-return valves in accordance with the invention into a unit of co-axially arranged rings and seats, this resulting, inter alia, in the advantage that the non return valve can have a smaller diameter, so that the unit takes up less room. Thus, in a simple way, it is possible to build up the non-return valve in accordance with the invention to a desired capacity, enabling the provision of differently sized non return valves simply and cheaply independent of desired through-flow in the case in question.

The invention has been described in conjunction with a steel ring, but this may also be replaced to advantage by a plastics ring in certain cases.

As disclosed above, the basic feature of the invention is to substantially prevent the outer edge of the ring to move axially and to obtain opening substantially by flexing the ring to the shape of a truncated cone. Since there is always a certain play at the outer edge of the ring which preferably should be kept as small as possible to obtain best result, the opening of the valve is also dependent on the small axial movement allowable by said axial play. In certain applications it may be necessary to increase this axial play within certain limits to obtain a greater through-flow in the valve. However, this will result in a decreasing efficiency which to a certain degree may be acceptable in order to permit for example a greater diameter of the pulse pipe, that is the outlet pipe from the combustion chamber.

I claim:

1. A pulsating burner comprising:
   a combustion chamber;
   an axial duct communicating at a downstream end with the combustion chamber;
   an axially central structure disposed in said duct so as to cooperate with said duct to form an axially elongated annular passageway which flares radially outwards at an upstream end thereof, so as to be defined near an upstream end thereof by a wall surface of said central structure and a wall surface of said duct, which wall surfaces, in corresponding confronting annular portions thereof are axially spacedly adjacent and approach one another as they extend radially outwardly;
   a fuel injector nozzle provided on said central structure downstream of said confronting annular portions of said wall surfaces;
   wall means defining a sub-pressure chamber for combustion air externally of said duct;
   means defining a plurality of circumferentially distributed openings through said wall surface of said duct, for communicating said sub-pressure chamber with said annular passageway;
   a thin, normally flat, elastically flexible steel ring having two axially opposite faces, a radially outer circumferential edge and a radially inner circumferential edge;
   said flexible ring being disposed in said annular passageway axially between said confronting annular portions of said wall surfaces of said central structure and duct;
   said confronting annular portion of said wall surface of said duct being a surface of revolution;
   circumferentially uniform, radially thin annular abutments provided on said confronting annular portions of said wall surfaces, said annular abutments being spaced apart only slightly more than the thickness of said flexible ring and being juxtaposed with radially outer marginal portions of said opposite faces of said flexible ring adjacent said radially outer circumferential edge;
   said ring being rotatable in the circumferential direction thereof between said annular abutments;
   said confronting annular portions of said wall surfaces being spaced axially sufficiently far apart in axial alignment with said radially inner circumferential edge of said flexible ring as to permit said flexible ring to elastically flex between a flat state and a frusto-conical state, in one of which one face of said flexible ring covers and thereby closes said openings and in the other of which said one face of said flexible ring stands away from said openings so that air may flow between sub-pressure chamber and said duct;
   said flexible disk when in said frusto-conical state having a maximum cone angle on the order of 3 degrees.

2. The pulsating burner of claim 1, wherein:
   said flexible ring is from 0.15 to 0.30 mm in thickness and can be flexed between said flat state and said frusto-conical state with the application thereto of a pressure Vp equivalent to 2 mm $H_2O$.

3. In a pulsating burner having a combustion chamber, an annular valve seat concentrically surrounding an inlet to said combustion chamber and at least one air inflow port through said valve seat for introducing air into said inlet;
   a valve member for opening and closing the port, said valve member being a flat, relatively thin circular ring of elastically flexible steel having an inner circumferential edge and an outer circumferential edge, said ring being concentric with the valve seat and engageable and disengageable therewith to close and open the port, the outer edge of the ring being located, with a predetermined play, between two axially spaced, annular abutments which form surfaces of revolution and cooperate with only the outer edge of the ring along its whole circumference so that when the valve ring is disengaged from the valve seat the outer edge of the ring rests against one of the abutments and so that the inner edge of the ring moves away from the valve seat a greater distance than does the outer edge of the ring, the ring in such disengaged position forming substantially a truncated cone the concave surface of which is the annular surface of the ring which faces said port and the combustion chamber inlet whereby air passes through said port, through an annular space between said valve seat and the inner edge of the valve ring and into the inlet to the combustion chamber, said truncated cone having a cone angle having a maximum value on the order of three degrees.

* * * * *